US011102504B2

(12) United States Patent
Yamori

(10) Patent No.: US 11,102,504 B2
(45) Date of Patent: Aug. 24, 2021

(54) COMPUTER-READABLE RECORDING MEDIUM STORING VIDEO ENCODING PROGRAM AND VIDEO ENCODING APPARATUS

(71) Applicant: FUJITSU LIMITED, Kawasaki (JP)

(72) Inventor: Akihiro Yamori, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/713,681

(22) Filed: Dec. 13, 2019

(65) Prior Publication Data
US 2020/0228823 A1 Jul. 16, 2020

(30) Foreign Application Priority Data
Jan. 15, 2019 (JP) .............................. JP2019-004487

(51) Int. Cl.
*H04N 19/52* (2014.01)
*H04N 19/573* (2014.01)
(Continued)

(52) U.S. Cl.
CPC ........... *H04N 19/52* (2014.11); *H04N 19/159* (2014.11); *H04N 19/176* (2014.11); *H04N 19/573* (2014.11)

(58) Field of Classification Search
CPC .... H04N 19/52; H04N 19/159; H04N 19/176; H04N 19/573
(Continued)

(56) References Cited

U.S. PATENT DOCUMENTS 8,254,456 B2 * 8/2012 Lee ..................... H04N 19/159
375/240.16
2008/0181309 A1 * 7/2008 Lee ..................... H04N 19/197
375/240.16
(Continued)

FOREIGN PATENT DOCUMENTS

JP 2011-35444 2/2011
JP 2017-69866 4/2017

OTHER PUBLICATIONS

J.Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document: JVET-G1001-v1, 7th Meeting: Torino, IT, pp. 1-46, Jul. 13-21, 2017.

*Primary Examiner* — Joseph G Ustaris
*Assistant Examiner* — Jimmy S Lee
(74) *Attorney, Agent, or Firm* — Staas & Halsey LLP

(57) ABSTRACT processors set a search-range from a first processing-block to a side closer to the first processing-block by a size of a second processing-block from a boundary between a refreshed area and an unrefreshed area in a second picture preceding a first picture in which the first processing-block exists in the encoding order, detect a first motion vector for the first processing-block in the search-range, perform a weighted average of a second motion vector detected in the second processing-block around the first processing-block and the first motion vector to obtain the first motion vector, generate first prediction data by using the first motion vector and the second picture, use another block in an intra slice line of the first picture to generate second prediction data in the block in the intra slice line, and encode the first picture by using the first and second prediction data.

16 Claims, 17 Drawing Sheets

(51) Int. Cl.
*H04N 19/159* (2014.01)
*H04N 19/176* (2014.01)

(58) Field of Classification Search
USPC .................................................... 375/240.16
See application file for complete search history.

(56) References Cited

U.S. PATENT DOCUMENTS

| | | |
|---|---|---|
| 2011/0026597 A1 | 2/2011 | Tanaka et al. |
| 2015/0163493 A1* | 6/2015 | Huang .................... G06T 7/215 |
| | | 375/240.03 |
| 2016/0241875 A1* | 8/2016 | Wu ...................... H04N 19/423 |
| 2017/0099491 A1* | 4/2017 | Lei ....................... H04N 19/507 |
| 2018/0376166 A1* | 12/2018 | Chuang .................. H04N 19/59 |
| 2019/0037217 A1* | 1/2019 | Jin ....................... H04N 19/105 |

* cited by examiner

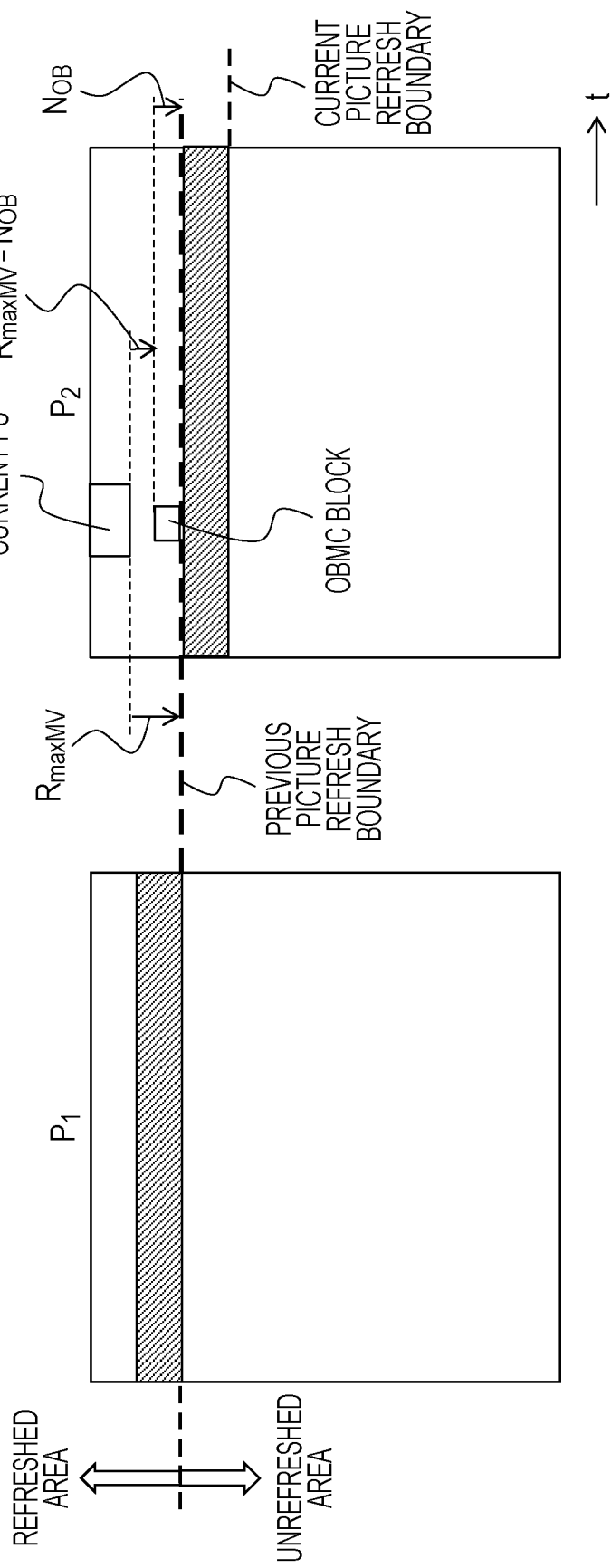

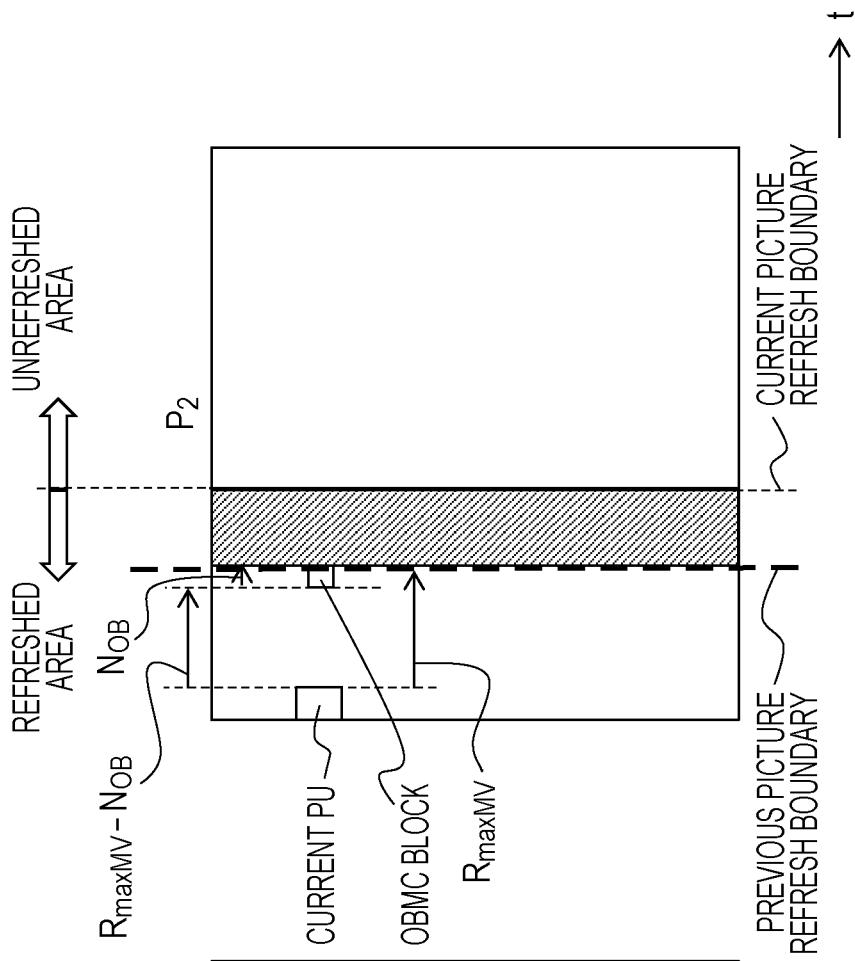
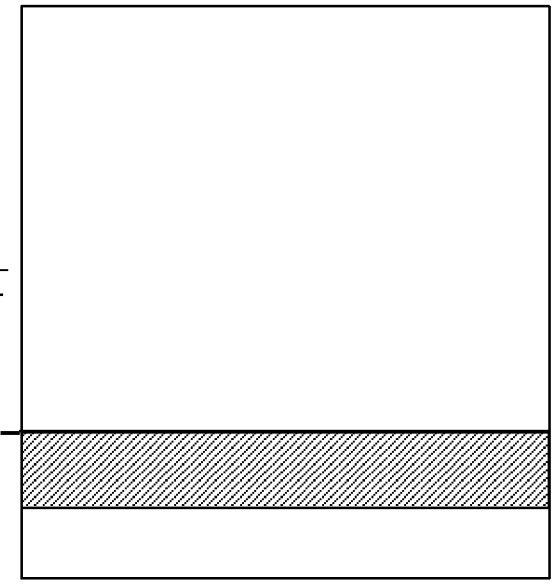
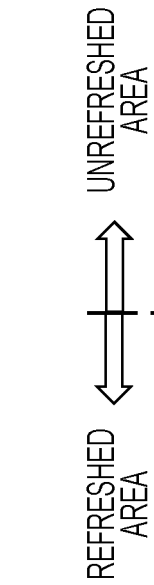

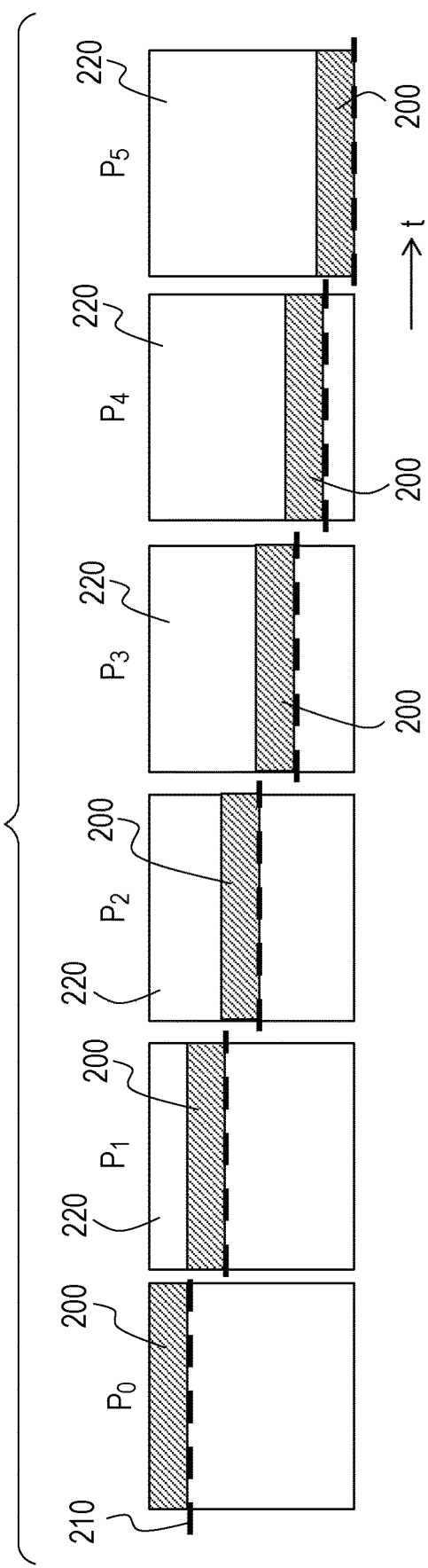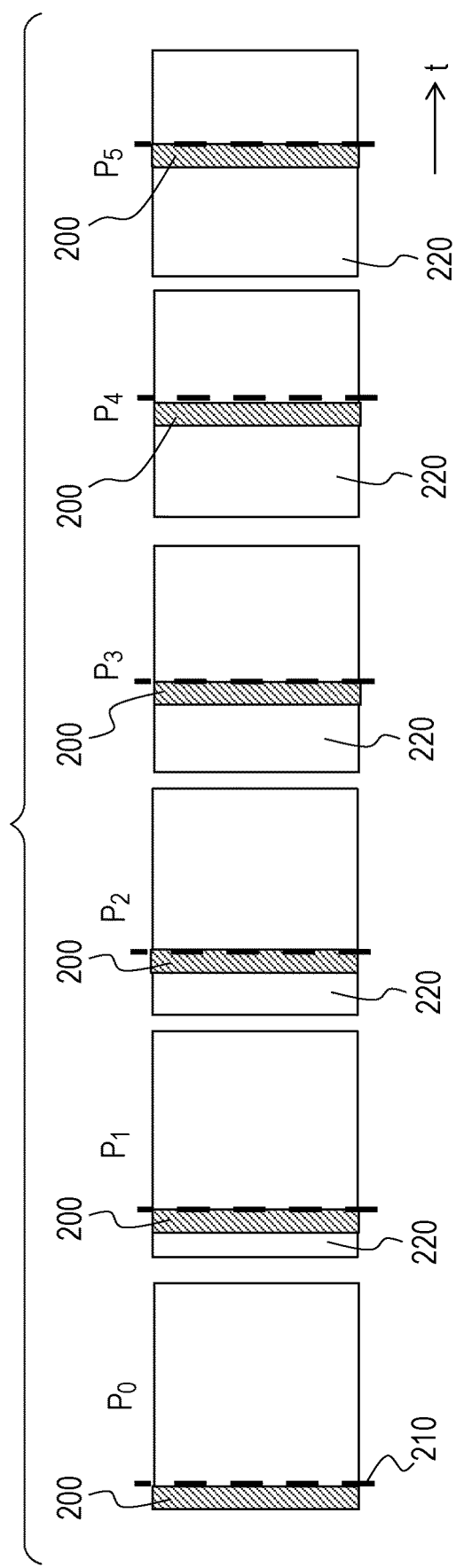

COMPUTER-READABLE RECORDING MEDIUM STORING VIDEO ENCODING PROGRAM AND VIDEO ENCODING APPARATUS

CROSS-REFERENCE TO RELATED APPLICATION

This application is based upon and claims the benefit of priority of the prior Japanese Patent Application No. 2019-4487, filed on Jan. 15, 2019, the entire contents of which are incorporated herein by reference.

FIELD

The embodiment discussed herein is related to a computer-readable recording medium including a video encoding program and a video encoding apparatus.

BACKGROUND

Regarding a compression encoding technology of video, there is ISO/IEC 23008-2 (or ITU-T (International Telecommunication Union Telecommunication Standardization Sector) H.265 "High efficiency video coding") (hereinafter, referred to as "HEVC") as a standard by ISO/IEC (International Organization for Standardization/International Electrotechnical Commission), for example. HEVC defines an encoding method for 4K (=3840 lines×2160 pixels) images and 8K (=7680 lines×4320 pixels) images.

In the encoding method by HEVC, two types of prediction modes, an intra prediction mode and an inter prediction mode, may be switched on a block basis within one frame (or picture). The intra prediction mode is a mode for predicting an image in a spatial direction from a current picture to be encoded, for example. The inter prediction mode is a mode for predicting an image in a temporal direction by using a picture different from the current picture to be encoded, for example. For example, an encoding apparatus may calculate the costs of the intra prediction mode and the inter prediction mode and select the prediction mode with the lower cost.

In a video encoding apparatus, an encoding method (hereinafter, may be referred to as "intra refresh method") based on an intra refresh (or intra slice) method may be used. The intra refresh method is an encoding method in which, for example, a part of a picture encoded in the inter prediction mode is encoded in the intra prediction mode. In the intra refresh method, an area (or intra slice) to be encoded in the intra prediction mode is circulated by using a plurality of pictures at a predetermined period.

FIGS. 14A and 14B are diagrams illustrating examples of the intra refresh method. Among FIGS. 14A and 14B, FIG. 14A illustrates an example of a horizontal intra refresh method, and FIG. 14B illustrates an example of a vertical intra refresh method. In FIGS. 14A and 14B, the horizontal axis represents the time t direction.

In the example illustrated in FIG. 14A, an intra slice 200 is in the horizontal direction over the screen and moves in the vertical direction (or downward direction) as time elapses. In the video encoding apparatus, the intra slice 200 is circulated in the entire picture at a certain refresh cycle. A refresh boundary 210, which is the lower end of the intra slice 200, gradually moves downward as time t elapses. Therefore, a refreshed area 220 is gradually expanded as the time t elapses. In the processing block of the refreshed area 220, encoding is performed with reference to the refreshed area of the current picture or the refreshed area of a past picture. When the intra slice 200 goes around, the entire picture is refreshed. For example, when editing is performed from a picture temporally prior to a picture $P_0$, decoding may be resumed from a picture $P_5$ after one round on a decoding side.

In the example illustrated in FIG. 14B, the intra slice is in the vertical direction over the screen and moves in the horizontal direction (or right direction) as the time t elapses. Also in this case, the refresh boundary 210 gradually moves to the right as the time t elapses, and the refreshed area 220 is gradually expanded. When the intra slice 200 goes around, all the pictures are refreshed.

In this way, in the intra refresh method, since the area to be encoded in the intra prediction mode is included in the picture to be encoded in the inter prediction mode, the code amount of the entire picture may be made uniform among the pictures. Therefore, the capacity of a transmission buffer used when transmitting an encoded bit stream to the network may be kept below a certain level, and buffer delay may be suppressed compared with an encoded bit stream including an I (Intra) picture periodically. In the intra refresh method, since the intra slice 200 is included and the entire screen is refreshed after a refresh period has elapsed, it is possible to suppress deterioration in image quality of the entire video data.

FIG. 15 is a diagram illustrating a relationship between an input order and an encoding order in a refresh encoding method. In FIG. 15, "P" represents a P (Predictive) picture, and the subscript represents the input order. As illustrated in FIG. 15, in the refresh encoding method, encoding is performed in the order of picture input. In the intra refresh method, encoding is performed in the order of input, and it is possible to get rid of a complicated reference relationship as compared with other encoding methods (for example, time hierarchy encoding method).

The intra refresh method may be referred to as a low delay encoding method, for example.

Meanwhile, Joint Video Exploration Team (JVET) was formed as a joint working group between ISO/IEC and ITU-T, and next-generation video compression technology is being studied. In JVET, the use of overlapped block motion compensation (OBMC) as a motion compensation technique is being studied. OBMC is a technique for calculating a motion vector of a current processing block by, for example, performing a weighted average of motion vectors of peripheral blocks and the motion vector of the current processing block.

FIGS. 16A and 16B are diagrams illustrating examples of OBMC. In OBMC based on JVET, for example, 4 lines×4 pixels or 8 lines×8 pixels are used as sub-blocks, and processing is performed in units of sub-blocks. For example, one or more sub-blocks are included in one prediction unit (PU). In OBMC by JVET, there are two modes: a mode (for example, FIG. 16A) to execute OBMC for the PU boundary and a mode (for example, FIG. 16B) to execute OBMC for all sub-blocks of a current CU (Coding Unit).

In the former mode, as illustrated in FIG. 16A, when generating motion vectors of sub-blocks indicated by diagonal lines, in each sub block 230 in the horizontal direction in the PU boundary, the motion vectors are calculated by using the motion vectors of the sub-blocks adjacent to the upper side of each sub block 230. In each sub block 240 in the vertical direction in the PU boundary, motion vectors are calculated by using the motion vectors of the sub-blocks adjacent to the left side of each sub block 240.

In the latter mode, as illustrated in FIG. 16B, a motion vector of a sub-block to be processed (for example, white sub-block) is calculated by using the motion vectors of the four sub-blocks (for example, sub-blocks indicated by horizontal lines) adjacent to the sub-block to be processed vertically and horizontally.

Thus, in OBMC, since the motion vector of a processing a current block is calculated by using the motion vectors of the peripheral blocks, for example, it is possible to obtain the uniformity of motion prediction and obtain the same encoding efficiency as a B picture.

OBMC itself is also being studied in H.263. In H.263, OBMC is applied, for example, in a case where a macroblock is divided into four luminance prediction blocks of 16 lines×16 pixels and 8 lines×8 pixels, in an unlimited motion vector mode in the P picture.

FIGS. 17A to 17D are diagrams illustrating examples of OBMC applied in H.263. The motion vector of a current luminance block is calculated by weighted addition of the motion vector of the current luminance block (processing a current block) indicated by the diagonal lines and the motion vectors of two blocks adjacent to the current luminance block.

The sub-blocks for the processing a current block are, for example, all or a part of the upper, lower, left, and right blocks adjacent to the processing a current block.

As such compression encoding technology, for example, there are the following techniques. That is, there is an image processing apparatus that generates corresponding pixels corresponding to adjacent pixels by filtering using the adjacent pixels and sets a search range so as not to include the corresponding pixels corresponding to the number of adjacent pixels from a boundary line of a forced intra block to detect a motion vector in the search range.

According to this technique, the time required for error recovery may be shortened.

In addition, there is a video encoding apparatus that sets the width of an intra slice of each picture in a cyclic direction of the intra slice so that the amount of generated information in the intra slice is equal for each picture to perform encoding by an intra refresh method for each picture.

According to this technique, it is possible to suppress fluctuations in the amount of information generated in intra slices between pictures while keeping a refresh cycle regular.

An example of related art includes Jianle Chen et al., "Algorithm Description of Joint Exploration Test Model 7 (JEM 7)", 7th Meeting: Torino, IT, 13-21 Jul. 2017.

Japanese Laid-open Patent Publication No. 2011-35444 and Japanese Laid-open Patent Publication No. 2017-69866 are other examples of related art.

SUMMARY

According to an aspect of the embodiments, a non-transitory computer-readable recording medium includes a video encoding program which, when executed by a first processor coupled to a memory and a second processor coupled to the first processor, cause the first processor and the second processor to: set, by the first processor, a search range of a reference block for a first processing block to a range from the first processing block to a side closer to the first processing block by a size of a second processing block from a refresh boundary between a refreshed area through which an intra slice line has passed in a second picture preceding a first picture in which the first processing block exists in an encoding order and an unrefreshed area through which the intra slice line has not passed, detect, by the second processor, a first motion vector for the first processing block in the search range, and perform a weighted average of a second motion vector detected in the second processing block around the first processing block and the first motion vector to obtain the first motion vector, and generate, by the second processor, first prediction data by using the first motion vector and the second picture, generate second prediction data in a block in the intra slice line by using another block in the intra slice line of the first picture, and encode the first picture by using the first and second prediction data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B are diagrams illustrating examples of search ranges;

FIGS. 8A and 8B are diagrams illustrating examples of search ranges;

FIGS. 14A and 14B are diagrams illustrating examples of an intra refresh method;

DESCRIPTION OF EMBODIMENTS

For example, in an intra refresh method, when motion compensation by OBMC is applied, OBMC may not operate normally.

That is, in OBMC, the motion vectors of peripheral blocks are used for processing a current block. Therefore, there are cases where the peripheral blocks exceed a refresh boundary of a previous picture that precedes a current picture in an encoding order. In this case, a motion vector of the current picture that points to an unrefreshed area that exceeds the refresh boundary of the previous picture may be generated. When such a motion vector is generated, a decoded image of the current picture is generated by using image data in the unrefreshed area of the previous picture on a decoding side. Therefore, if an error is included in the unrefreshed area, the decoding side generates a decoded image including the error. In such a case, OBMC is not operating normally, and the decoded image may deteriorate.

The technique for setting the search range so as not to include the corresponding pixels corresponding to the number of adjacent pixels from the boundary line of the forced intra block described above is not discussed at all about OBMC. Therefore, in the above-described technique, in a case where motion compensation by OBMC is applied in the intra refresh method, there is no suggestion of a solution to the problem that motion vectors exceeding the refresh boundary of the previous picture are generated and OBMC does not operate normally.

The above-described technique for setting the width of the intra slice of each picture in the cyclic direction of the intra slice so that the amount of generated information in the intra slice is equal for each picture is not discussed at all for OBMC. Therefore, this technique also does not suggest any solution to the problem that OBMC does not operate normally in a case where OBMC is applied in the intra refresh method.

Hereinafter, the present embodiments will be described in detail with reference to the accompanying drawings. The problems and embodiments described herein are exemplary and are not intended to limit the scope of the present disclosure. In each of the embodiments, it is possible to combine functions appropriately as long as the functions do not contradict the processing contents. As terms and technical contents described in this specification, terms and technical contents described in standards as image compression encoding standards such as ISO/IEC may be used as appropriate.

First Embodiment

Configuration Example of Video Encoding Apparatus

Figure 1:
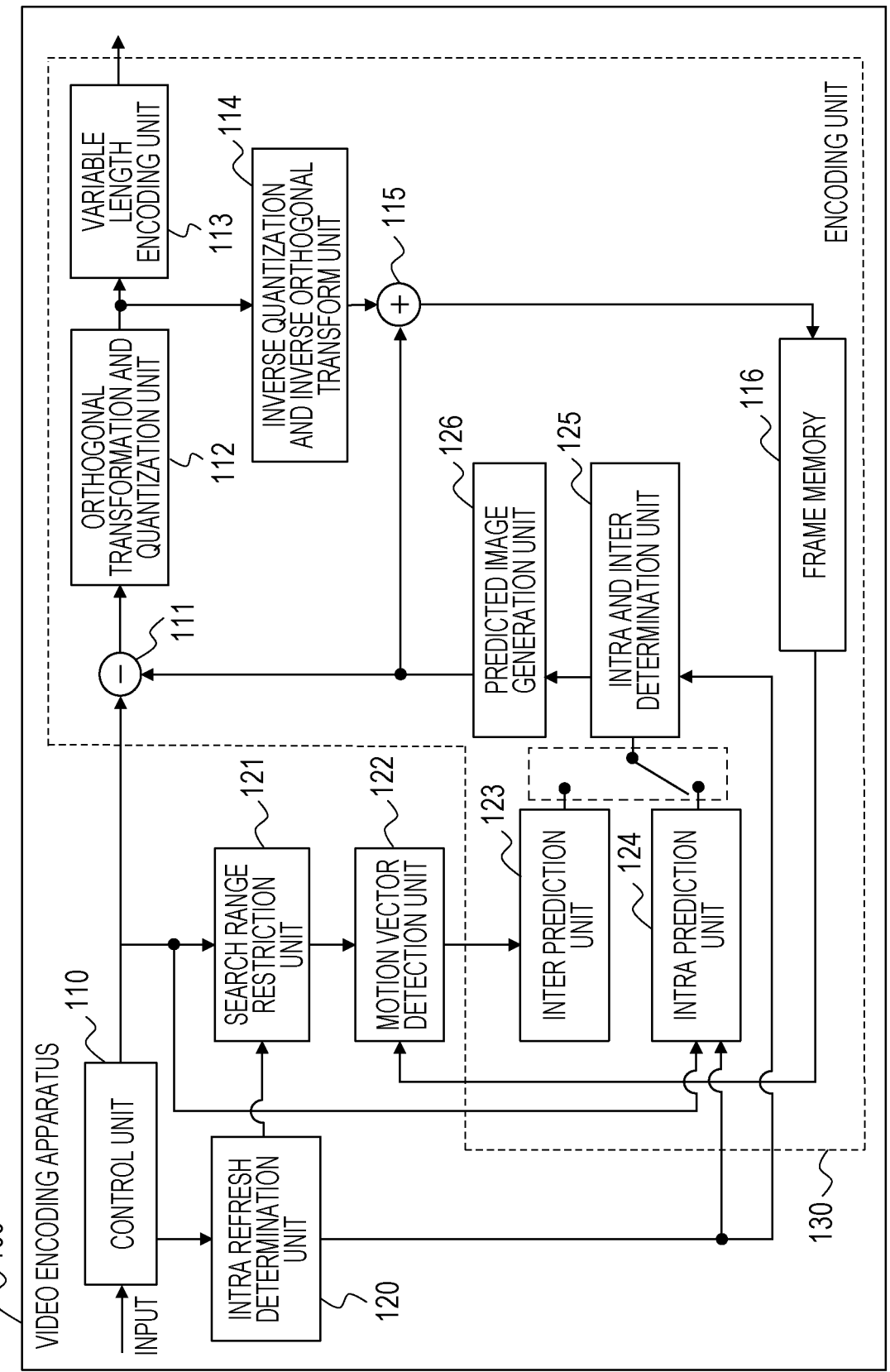
FIG. 1 is a diagram illustrating a configuration example of a video encoding apparatus.

FIG. 1 is a diagram illustrating a configuration example of a video encoding apparatus 100 according to a first embodiment.

The video encoding apparatus 100 performs compression encoding processing by using an intra refresh method. In the intra refresh method, for example, a part of a picture to be encoded by using inter prediction encoding is encoded by using intra prediction encoding, and an intra slice line on which intra prediction encoding is performed is circulated by using a plurality of pictures. With the intra refresh method, for example, buffer delay may be suppressed, and deterioration of the image quality of the entire video data may also be suppressed. An encoding method based on the intra refresh method may be referred to as low delay encoding, for example.

The video encoding apparatus 100 may perform motion compensation by using OBMC. OBMC is, for example, a method in which a motion vector of a processing a current block and a motion vector of peripheral blocks around the processing a current block are weighted and averaged to obtain a motion vector of the processing a current block. With OBMC, for example, it is possible to obtain encoding efficiency equivalent to that of the B picture.

The video encoding apparatus 100 includes a control unit 110, a subtraction unit 111, an orthogonal transformation and quantization unit 112, a variable length encoding unit 113, an inverse quantization and inverse orthogonal transformation unit 114, an addition unit 115, and a frame memory 116. The video encoding apparatus 100 further includes an intra refresh determination unit 120, a search range restriction unit 121, a motion vector detection unit 122, an inter prediction unit 123, an intra prediction unit 124, an intra and inter determination unit 125, and a predicted image generation unit 126.

The control unit 110 inputs the image data of an input image and outputs the image data of the input image in units of CUs, for example. The control unit 110 outputs the image data of the input image to the subtraction unit 111, the intra refresh determination unit 120, and the search range restriction unit 121.

The control unit 110 determines whether or not to apply OBMC, and if so, outputs to the intra refresh determination unit 120 and the search range restriction unit 121 that the OBMC mode is to be applied. Whether or not to apply OBMC may be determined based on whether or not the control unit 110 has received input information to apply OBMC from a user, for example.

Hereinafter, "image" and "video" may be used without distinction. In some cases, "image" and "image data" are used without distinction.

The subtraction unit 111 subtracts the image data of the predicted image output from the predicted image generation unit 126 from the image data of the input image and generates image data of a difference image. As the predicted image, since the intra refresh method is applied, one picture includes predicted image data predicted in the inter prediction mode and a part of the picture (or intra slice) includes prediction data predicted in the intra prediction mode. The subtraction unit 111 outputs the image data of the difference image to the orthogonal transform and quantization unit 112.

The orthogonal transform and quantization unit 112 performs integer transform on the image data of the difference image, for example, in units of transform unit (TU) to transform the image data into a frequency domain (or performs orthogonal transform). The orthogonal transform and quantization unit 112 calculates a quantized value obtained by dividing the image data of the difference image after the integer transform by the quantization step, for example, in units of TU. The orthogonal transform and quantization unit 112 outputs the calculated quantized value to the variable length encoding unit 113 and the inverse quantization and inverse orthogonal transform unit 114.

The variable length encoding unit 113 encodes the quantized value by using, for example, an encoding method based on universal variable length coding (UVLC) based on Huffman encoding. The variable length encoding unit 113 outputs the encoded image data. As for the encoding method, for example, encoding may be performed by using a calculated encoding method.

The inverse quantization and inverse orthogonal transform unit 114 calculates the image data after the integer conversion before becoming the quantized value by multiplying the quantized value by the quantization step used in the orthogonal transformation and quantization unit 112. The inverse quantization and inverse orthogonal transform unit 114 generates image data of the difference image before the integer conversion by performing inverse integer conversion processing on the image data after the integer conversion. The inverse quantization and inverse orthogonal transform unit 114 outputs the image data of the difference image.

The addition unit 115 adds the image data of the difference image output from the inverse quantization and inverse orthogonal transform unit 114 and the image data of the predicted image output from the predicted image generation unit 126 to generate a decoded image. The addition unit 115 outputs the image data of the decoded image to the frame memory 116.

The frame memory 116 is a memory that stores image data of a decoded image. The addition unit 115 stores the image data of the decoded image in the frame memory 116, and the motion vector detection unit 122 reads the stored image data of the decoded image.

The intra refresh determination unit 120 outputs information indicating whether the processing a current block is a block processed in the inter prediction mode or a block processed in the intra prediction mode, to the search range restriction unit 121, the intra prediction unit 124, and the intra and inter determination unit 125. The intra refresh determination unit 120 outputs the image data of the input image to the intra prediction unit 124.

For example, when in OBMC mode and the processing a current block exists in the refreshed area of the current picture, the search range restriction unit 121 restricts the search range of the reference block for the block to be processed to a certain range. The certain range is, a range, for example, from the processing a current block to the side closer to the block to be processed by the OBMC block size (or one sub-block size of OBMC) from the refresh boundary in the previous picture before the current picture in which the processing a current block exists in the encoding order. Details will be described later.

When not in the OBMC mode and the processing a current block is within the range of the refreshed area of the current picture, for example, the search range restriction unit 121 restricts the search range of the reference block to a range from the processing a current block to the refresh boundary of the previous picture.

When in the OBMC mode and the processing a current block exists in the unrefreshed area, or when not in the OBMC mode and the processing a current block exists in the unrefreshed area, the search range restriction unit 121 does not restrict the search range.

When the information that is the intra prediction mode is received from the intra refresh determination unit 120, there is no particular processing, and when the information that is the inter prediction mode is received, the search range restriction unit 121 performs the above-described processing.

The search range restriction unit 121 outputs information about the search range and information about the presence or absence of the OBMC mode to the motion vector detection unit 122. The search range restriction unit 121 outputs the image data output from the control unit 110 to the motion vector detection unit 122.

The processing a current block in the search range restriction unit 121 is, for example, a PU. However, since the PU includes an OBMC block, for example, restricting the search range of the reference block for the PU by the search range restriction unit 121 is the same as restricting the search range of the reference block for the OBMC block.

For example, the motion vector detection unit 122 reads the image data of the decoded image of the previous picture from the frame memory 116, and searches for the reference block of the processing a current block of the current picture from the decoded image of the previous picture within the search range. Specifically, the motion vector detection unit 122 performs block matching between the processing a current block of the current picture and the reference block of the decoded image within the search range and searches for the reference block that most closely matches the processing a current block. The motion vector detection unit 122 detects the motion vector of the processing a current block by searching for such a reference block. The motion vector detection unit 122 does not detect a motion vector for the processing a current block included in the intra slice.

For example, in the OBMC mode, the motion vector detection unit 122 detects a motion vector in the search range in units of OBMC blocks (or a sub-block, hereinafter, may be referred to as an "OBMC block") included in the processing a current block.

Figure 16A:
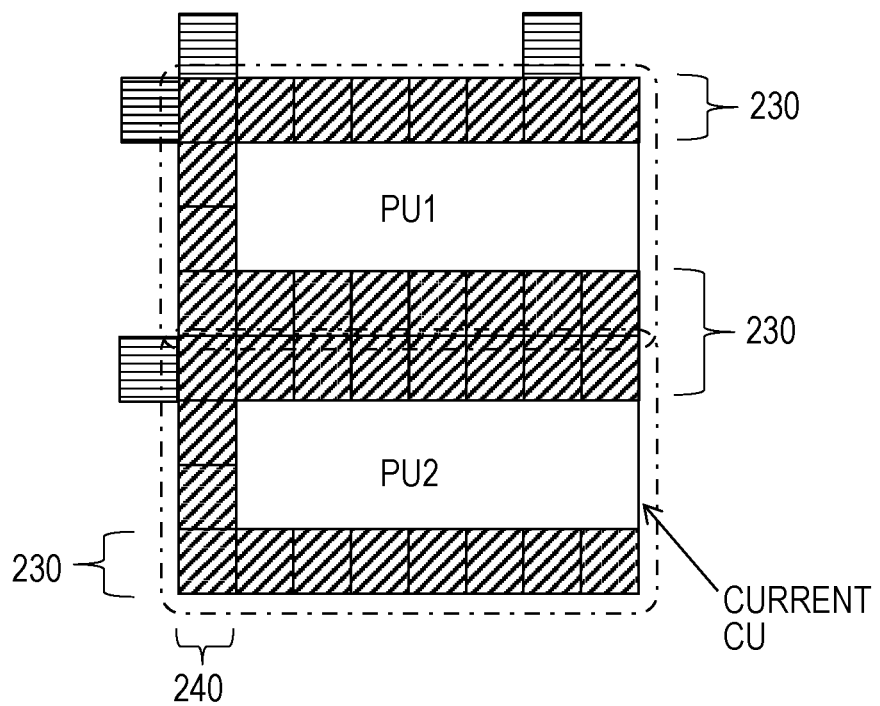
FIGS. 16A and 16B are diagrams illustrating an example of OBMC.

For example, when the OBMC mode is a mode that applies to sub-blocks at the PU boundary (for example, FIG. 16A), the motion vector detection unit 122 divides the PU into OBMC blocks at the PU boundary and detects a motion vector for each OBMC block. In this case, the motion vector detection unit 122 performs block matching for each OBMC block and searches for a reference block.

The motion vector detection unit 122 detects a motion vector in units of blocks in the area other than the OBMC blocks in the PU, where the area is a block unit.

Figure 16B:
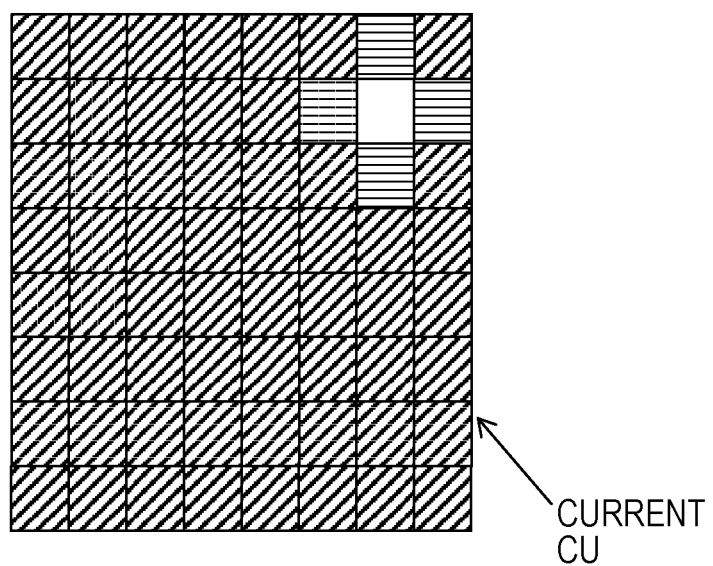
Figure 17A:
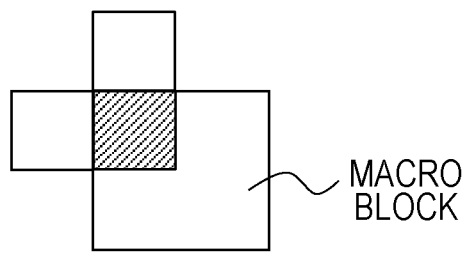
FIGS. 17A to 17D are diagrams illustrating examples of OBMC.
Figure 17B:
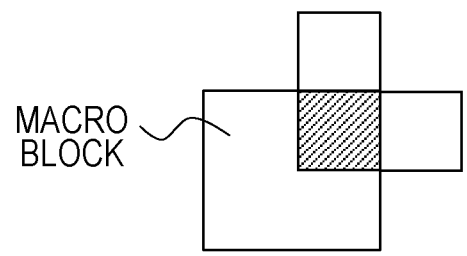
Figure 17C:
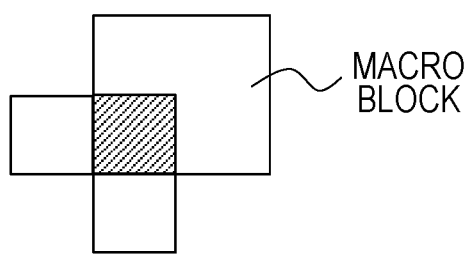
Figure 17D:
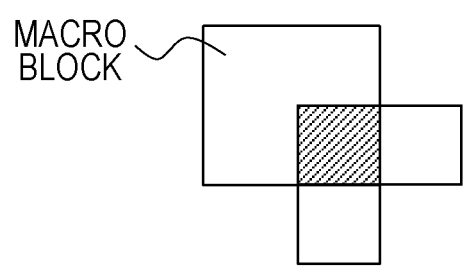

On the other hand, for example, in a case where the OBMC mode is a mode applied to all OBMC blocks in the PU (for example, FIG. 16B), the motion vector detection unit 122 divides the PU into OBMC blocks and detects motion vectors in units of OBMC blocks for all OBMC blocks in the PU.

The motion vector detection unit 122 calculates the motion vector of the processing a current block by using the motion vector of the processing a current block and the motion vectors of one or more peripheral blocks around the processing a current block.

Specifically, the motion vector detection unit 122 performs, for example, a weighted average of the motion vector of the processing a current block and the motion vectors of the peripheral blocks to obtain the motion vector of the processing a current block. The weighting weights used when calculating the weighted average may be, for example, all or a part of $\{1/4, 1/8, 1/16, 1/32\}$ for the motion vectors of the peripheral blocks, and all or a part of $\{3/4, 7/8, 15/16, 31/32\}$ for the motion vector of the processing a current block.

However, these weights are only examples, and other weights studied by JVET may be used. For example, the weight for the motion vector of the processing a current block may be larger than the weight for the motion vectors of the peripheral blocks.

The motion vector detection unit 122 outputs information about the detected motion vector, image data of a decoded image of the previous picture, and the like to the inter prediction unit 123.

The inter prediction unit 123 generates prediction data by using the image data of the decoded image of the previous picture and the motion vector. Specifically, the inter prediction unit 123 generates prediction data of a predicted image that is shifted by a motion vector with respect to the decoded image of the previous picture, for example. The inter prediction unit 123 outputs the prediction data to the intra and inter determination unit 125.

The inter prediction unit 123 may store, for example, prediction data generated in units of PUs or OBMC blocks in an internal memory, read the prediction data in units of CUs, and output the data to the intra and inter determination unit 125.

The intra prediction unit 124 generates prediction data of the predicted image by for example, by interpolating image data from other blocks in the intra slice near the processing block to the image data of the processing block in the intra slice of the current picture output from the control unit 110.

In order to receive information indicating that the current processing a current block is in the intra prediction mode from the intra refresh determination unit 120, the intra prediction unit 124 may generate prediction data of a predicted image for the processing a current block received from the control unit 110 by using this information.

When receiving information indicating that the current block is in the inter prediction mode, the intra prediction unit 124 may not perform any particular processing on the processing a current block received from the control unit 110.

The intra prediction unit 124 outputs the prediction data of the generated predicted image to the intra and inter determination unit 125. The unit of the processing block to be processed by the intra prediction unit 124 may be a CU (Coding Unit) or a CTU (Coding Tree Unit), for example.

The intra and inter determination unit 125 outputs the prediction data output from the inter prediction unit 123 or the intra prediction unit 124 to the predicted image generation unit 126 according to the information about the inter prediction mode or the intra prediction mode output from the intra refresh determination unit 120. Specifically, the intra and inter determination unit 125 outputs the prediction data output from the inter prediction unit 123 to the predicted image generation unit 126 in the inter prediction mode and outputs the prediction data output from the intra prediction unit 124 to the predicted image generation unit 126 in the intra prediction mode.

The predicted image generation unit 126 outputs the prediction data received from the intra and inter determination unit 125 to the subtraction unit 111 and the addition unit 115 as image data of the predicted image.

The video encoding apparatus 100 includes an encoding unit 130. The encoding unit 130 includes the subtraction unit 111, the orthogonal transformation and quantization unit 112, the variable length encoding unit 113, the inverse quantization and inverse orthogonal transformation unit 114, the addition unit 115, and the frame memory 116. The encoding unit 130 includes the inter prediction unit 123, the intra prediction unit 124, the intra and inter determination unit 125, and the predicted image generation unit 126.

Example of Operation

Figure 2:
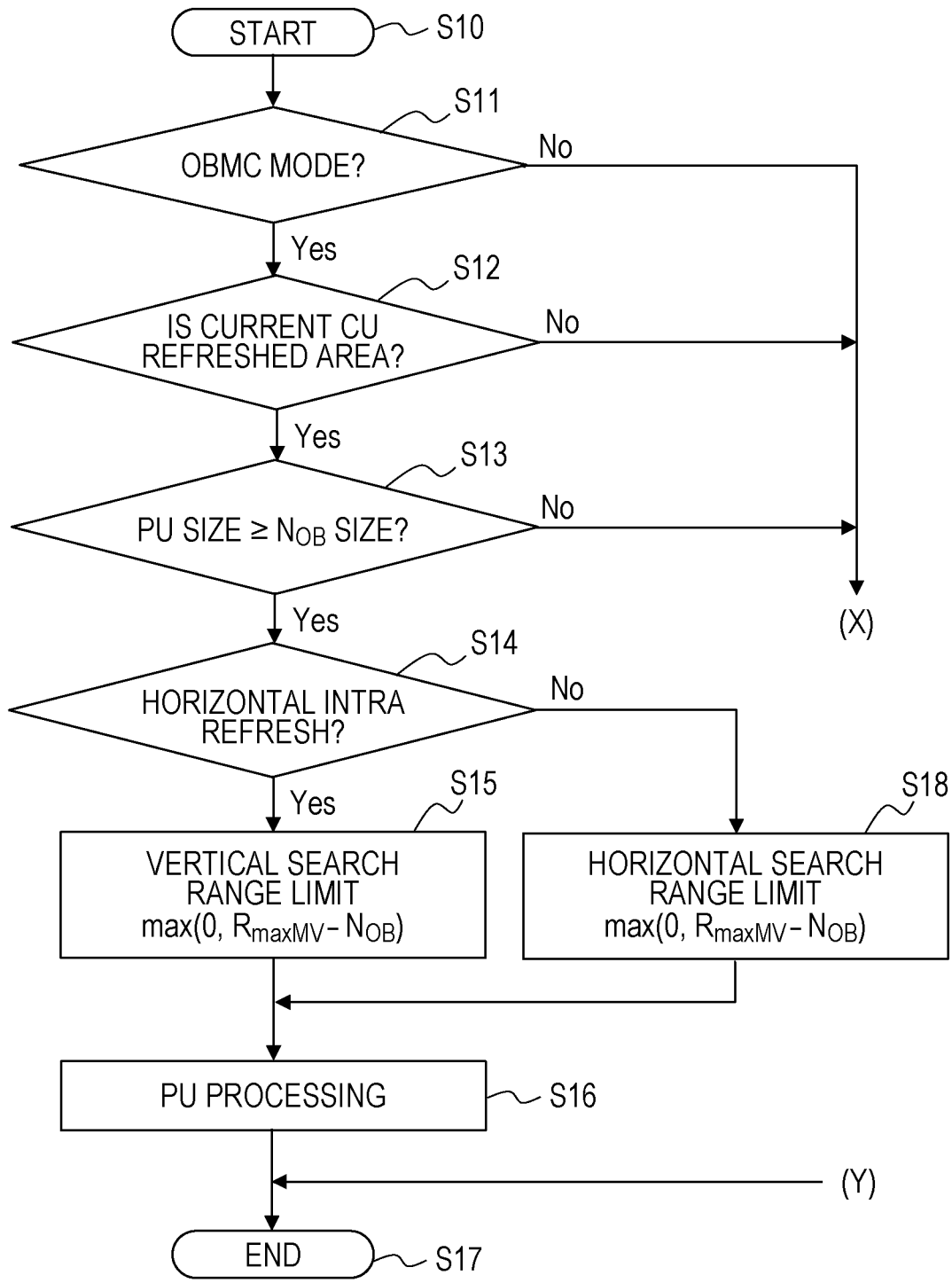
FIG. 2 is a flowchart illustrating an operation example.

FIG. 2 is a flowchart illustrating an operation example in the video encoding apparatus 100. The flowchart illustrated in FIG. 2 represents an operation example in the inter prediction mode.

When the processing is started (S10), the video encoding apparatus 100 determines whether or not the mode is the OBMC mode (S11). For example, the control unit 110 may determine whether or not the information indicating that the OBMC mode is to be applied is received from the user.

The video encoding apparatus 100 determines whether or not the current CU is a refreshed area (S12). For example, the control unit 110 outputs the image data of the input image in units of CUs to the subtraction unit 111 and the search range restriction unit 121, but determines whether or not the current CU that is the processing a current block exists in the refreshed area.

FIG. 4A is a diagram illustrating an example of a refreshed area and an unrefreshed area in the case of the horizontal intra refresh method in a certain picture P1. In FIG. 4A, a hatched area represents an intra slice. The lower end of the intra slice is the boundary between the refreshed area and the unrefreshed area, and this boundary is the refresh boundary.

For example, the control unit 110 holds information on refresh boundaries for each picture in the internal memory. Therefore, the control unit 110 may determine whether or not the current CU exists in the refreshed area depending on whether the current CU is an area above or below the refresh boundary based on the picture that contains the current CU and the position of the current CU in the picture. In the case of the vertical intra refresh method, the control unit 110 may determine whether the current processing block is an area left (or refreshed area) or a right area (or unrefreshed area) from the refresh boundary.

Motion compensation may be performed in units of PUs, for example. In this case, since one or more PUs are included in the CU, determining whether or not the current CU is a refreshed area may mean determining whether or not the current PU is a refreshed area.

Returning to FIG. 2, when the current CU is a refreshed area (Yes in S12), the video encoding apparatus 100 determines whether or not the PU size is equal to or larger than the $N_{OB}$ size that is the processing block unit of OBMC (S13). For example, the control unit 110 confirms whether or not the PU size is equal to or larger than the OBMC block size $N_{OB}$. For example, the control unit 110 stores the PU size and the block size $N_{OB}$ of OBMC in the internal memory, and may read out the PU size and the block size $N_{OB}$ of OBMC from the internal memory and perform the processing in this processing. The block size $N_{OB}$ of OBMC may be different for each sequence, for example.

When the PU size is equal to or larger than the block size $N_{OB}$ of OBMC (Yes in S13), the video encoding apparatus 100 determines whether or not horizontal intra refresh is to be performed (S14). For example, when applying the intra refresh method, the control unit 110 determines whether to perform processing with horizontal intra refresh or processing with vertical intra refresh and may determine whether to perform horizontal refresh according to the determination result.

During horizontal intra refresh (Yes in S14), the video encoding apparatus 100 restricts the search range of the reference block in the vertical direction to a range represented by the following Equation (1).

$$\max(0, R_{maxMV} - N_{OB}) \qquad (1)$$

Hereinafter, details of the search range illustrated in Equation (1) will be described.

Search Range in Vertical Direction

In Equation (1), $R_{maxMV}$ represents, for example, the distance from the processing a current block to the refresh boundary of the previous picture preceding the current picture in the encoding order from the current picture containing the processing a current block.

FIGS. 4A and 4B are diagrams illustrating examples of $R_{maxMV}$. In FIGS. 4A and 4B, the horizontal axis represents time t, the hatched area represents an intra slice, and the current processing a current block is "current PU".

As illustrated in FIG. 4B, the thick dotted line represents the refresh boundary of the previous picture $P_1$. As illustrated in FIG. 4B, for example, in a current picture $P_2$, the distance from the lower end of "current PU" to the refresh boundary of the previous picture $P_1$ is $R_{maxMV}$.

In Equation (1), $N_{OB}$ represents the size of a unit block of OBMC, for example, as described above. Therefore, $R_{maxMV} - N_{OB}$ represents, for example, a range from the current PU (lower end) to the side closer to the current PU by 1 OBMC block size $N_{OB}$ from the refresh boundary of the previous picture $P_1$.

Figure 5A:
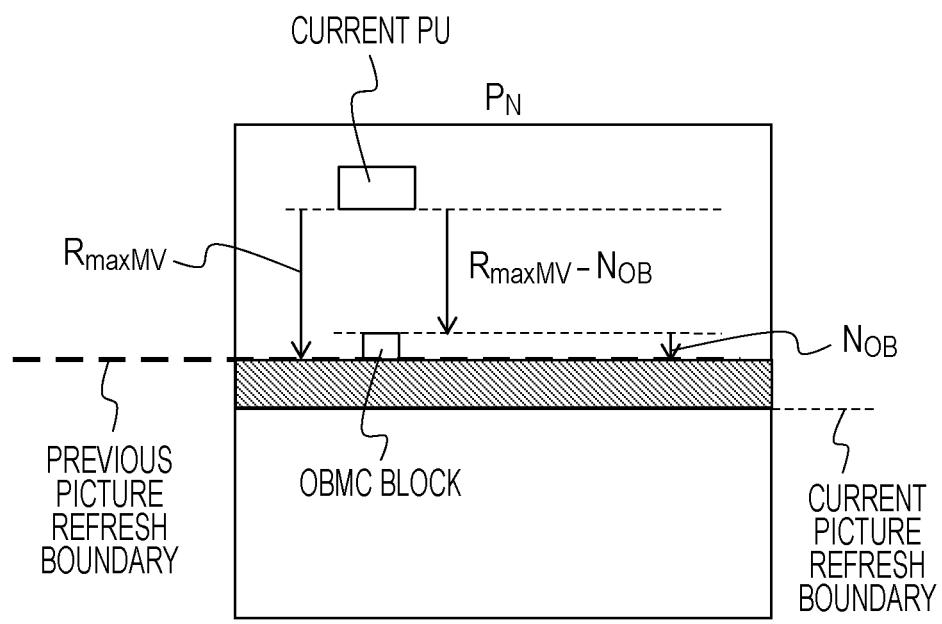
FIGS. 5A and 5B are diagrams illustrating examples of search ranges.
Figure 5B:
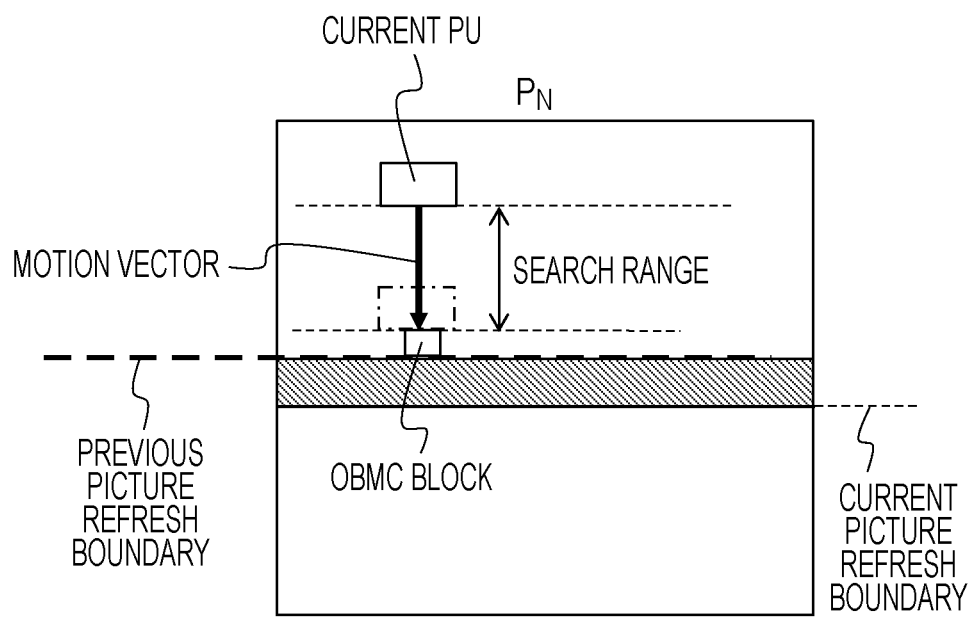

FIG. 5A illustrates an example when the current PU exists in a picture $P_N$, and FIG. 5B illustrates an example of a search range of the reference block for the current PU. As illustrated in FIGS. 5A and 5B, by restricting the search range of the reference block to the range of $(R_{maxMV}-N_{OB})$ by the search range restriction unit 121, it is possible to restrict the motion vector for the current PU to a range that does not exceed the refresh boundary of the previous picture. As illustrated in FIG. 5B, when the current PU is a processing a current block and the reference block for the current PU (block indicated by a one-dot chain line) is at the lower limit of the search range, the motion vector in this case is in a range not exceeding the refresh boundary of the previous picture.

Figure 6:
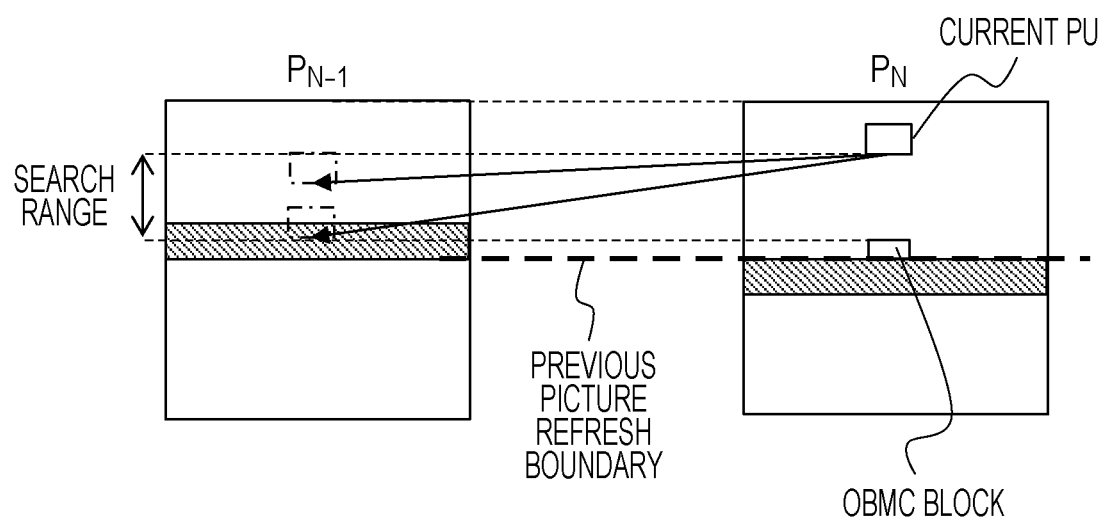
FIG. 6 is a diagram illustrating an example of a search range.

FIG. 6 is a diagram illustrating an example of the search range. As illustrated in FIG. 6, the search range of the reference block for detecting the motion vector of the current PU existing in the picture $P_N$ is actually the range of $(R_{maxMV}-N_{OB})$ in the previous picture $P_{N-1}$.

In the examples from FIG. 4B to 6, the example in which the distance $R_{maxMV}$ from the current PU to the refresh boundary of the previous picture is larger than the 1 OBMC block size $N_{OB}$ ($R_{maxMV}>N_{OB}$) has been described.

Figure 7A:
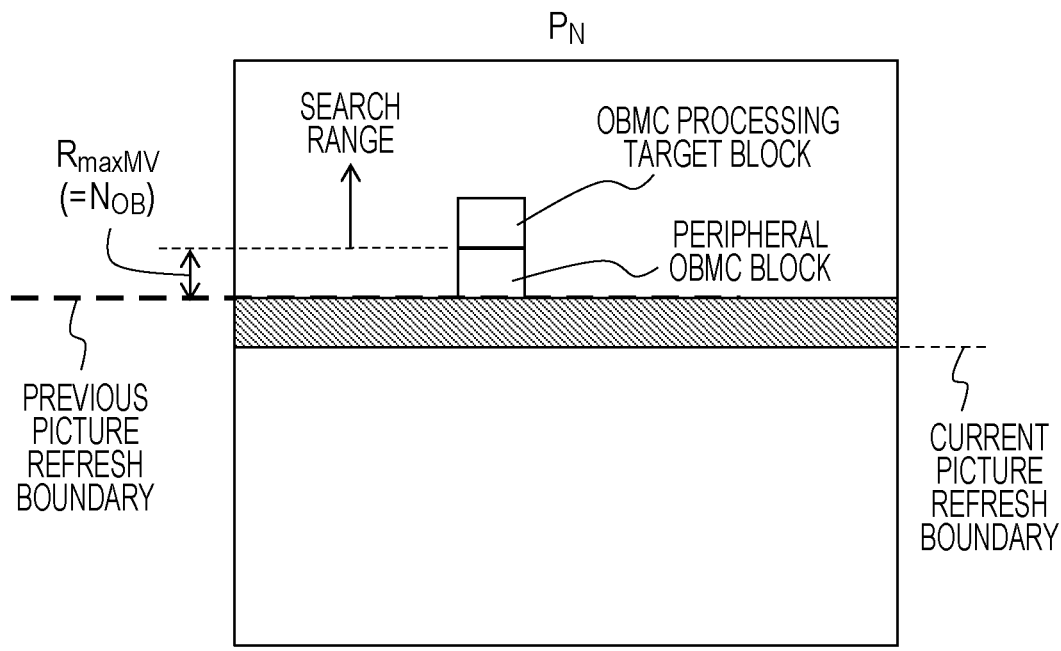
FIG. 7A is a diagram illustrating an example of a search range.

FIG. 7A is a diagram illustrating an example in which the distance $R_{maxMV}$ from the current PU to the refresh boundary of the previous picture is the same as the 1 OBMC block size $N_{OB}$ ($R_{maxMV}=N_{OB}$).

FIG. 7A illustrates an example in which an OBMC processing block included in the current PU is a processing a current block as the current PU. As illustrated in FIG. 7A, even in a case where the processing a current block is located at the lower limit of the search range, the search range is a range that satisfies Equation (1).

Therefore, in the case of OBMC, as illustrated in FIG. 7A, even if there is a peripheral OBMC block for the processing a current block under the processing a current block, if the peripheral OBMC block exceeds the search range, the peripheral OBMC block is not considered. Therefore, the motion vector detection unit 122 applies the OBMC by using the motion vector of the peripheral OBMC block existing within the search range without using the motion vector of the peripheral OBMC block existing out of the search range during the OBMC.

Figure 7B:
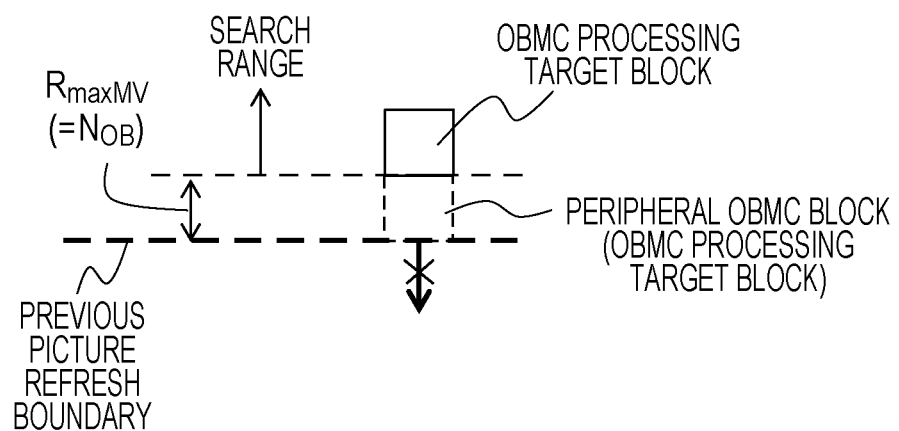
FIG. 7B is a diagram illustrating an example of a motion vector.

As illustrated in FIG. 7B, since the peripheral OBMC block out of the search range is not used for the processing a current block (OBMC block) that exists at the lower limit of the search range, even if the peripheral OBMC block has a motion vector that exceeds the refresh boundary, the motion vector is not used. Therefore, the motion vector detection unit 122 does not detect a motion vector that exceeds the refresh boundary of the previous picture for the processing a current block. In this case, the motion vector detection unit 122 detects the motion vector of the OBMC block to be processed by using the peripheral OBMC block within the search range.

As illustrated in FIG. 7B, there is a case where the processing a current block (OBMC block) exists just above the refresh boundary of the previous picture beyond the search range (dotted line block). In this case, the search range restriction unit 121 restricts the search range of the reference block for the processing a current block to a range that does not exceed the refresh boundary of the previous picture. As a result, the motion vector in the processing a current block may be suppressed not to exceed the refresh boundary of the previous picture.

In the above, the example of the search range of the reference block in the vertical direction at the time of horizontal intra refresh has been described.

Returning to FIG. 2, on the other hand, the video encoding apparatus 100 determines the search range of the reference block in the horizontal direction as illustrated in Equation (1) when horizontal intra refresh is not performed (No in S14), that is, when vertical intra refresh is performed. (S18). In Equation (1), the parentheses simply represent numerical values and do not correspond to the (x, y) coordinates.

Hereinafter, an example of the search range of the reference block in the horizontal direction at the time of vertical intra refresh will be described in detail.

Search Range in Horizontal Direction

FIGS. 8A and 8B are diagrams illustrating examples of $R_{maxMV}$.

The search range in the horizontal direction is basically the same as the search range in the vertical direction. As illustrated in FIG. 8B, the current PU is a processing a current block, and the distance from the right end of the current PU to the refresh boundary of the previous picture $P_1$ is $R_{maxMV}$. The search range $(R_{maxMV}-N_{OB})$ represents, for example, a range from the current PU (the right end thereof) to the side closer to the current PU by 1 OBMC block size $N_{OB}$ from the refresh boundary of the previous picture $P_1$.

Figure 9A:
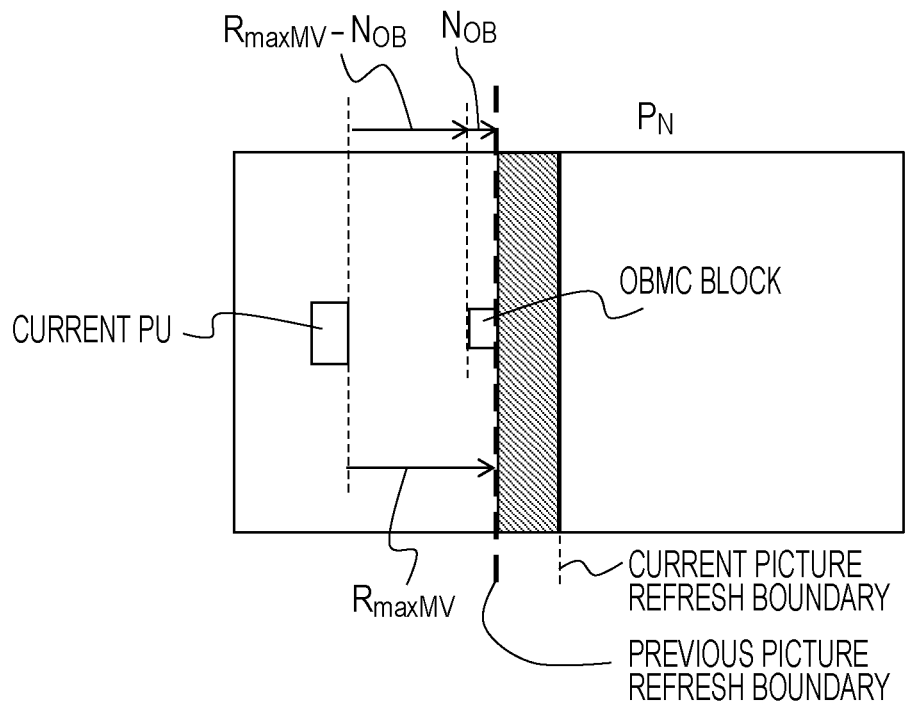
FIGS. 9A and 9B are diagrams illustrating examples of search ranges.
Figure 9B:
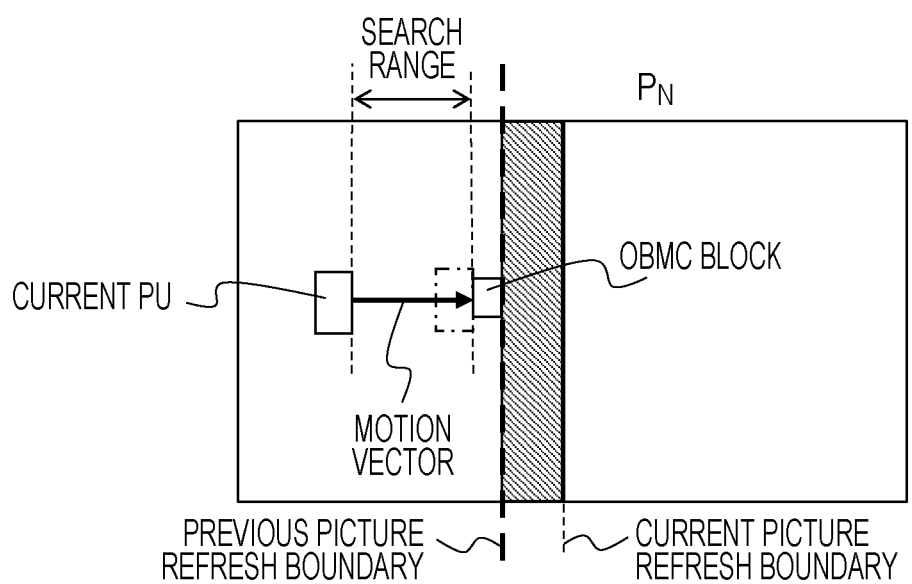

FIG. 9A illustrates an example when the current PU exists in the picture $P_N$, and FIG. 9B illustrates an example of a search range of the reference block for the current PU. As illustrated in FIGS. 9A and 9B, by restricting the search range of the reference block to the range of $(R_{maxMV}-N_{OB})$ by the search range restriction unit 121, it is possible to restrict the motion vector for the current PU so as not to exceed the refresh boundary of the previous picture. As illustrated in FIG. 9B, when the reference block for the current PU (block indicated by a one-dot chain) is at the right end of the search range, the search range restriction unit 121 sets a search range so as not to refer to a block that exceeds the search range. Accordingly, since the motion vector detection unit 122 does not refer to a block that exceeds the search range, the motion vector may be set to a range that does not exceed the refresh boundary of the previous picture.

Similarly to the search range in the vertical direction, the actual search range is within the search range of the previous picture before the picture in which the current PU exists (for example, FIG. 6).

Figure 10A:
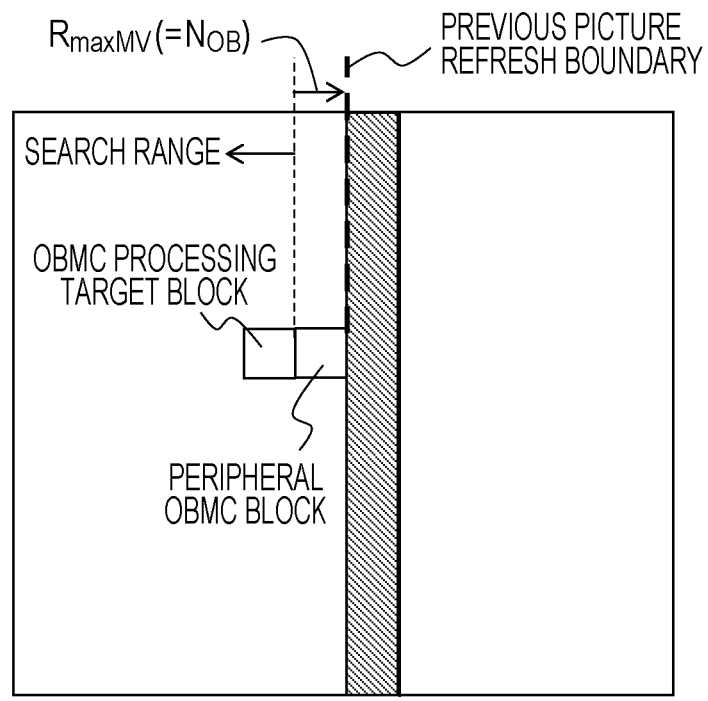
FIG. 10A is a diagram illustrating an example of a search range.

FIG. 10A is a diagram illustrating an example in which the distance $R_{maxMV}$ from the current PU to the refresh boundary of the previous picture is the same as the 1 OBMC block size $N_{OB}$ ($R_{maxMV}=N_{OB}$).

FIG. 10A illustrates an example in which an OBMC processing block included in the current PU is a processing a current block as the current PU. As illustrated in FIG. 10A, even in a case where the processing a current block is located at the right end of the search range, the search range is a range that satisfies Equation (1).

Therefore, as illustrated in FIG. 10A, in a case where there is a peripheral OBMC block for the processing a current block on the right side of the processing a current block, when the peripheral OBMC block is out of the search range, the peripheral block is not considered. Therefore, the motion vector detection unit 122 applies the OBMC by using the motion vector of the peripheral OBMC block existing within the search range without using the motion vector of the peripheral OBMC block existing out of the search range during the OBMC.

Figure 10B:
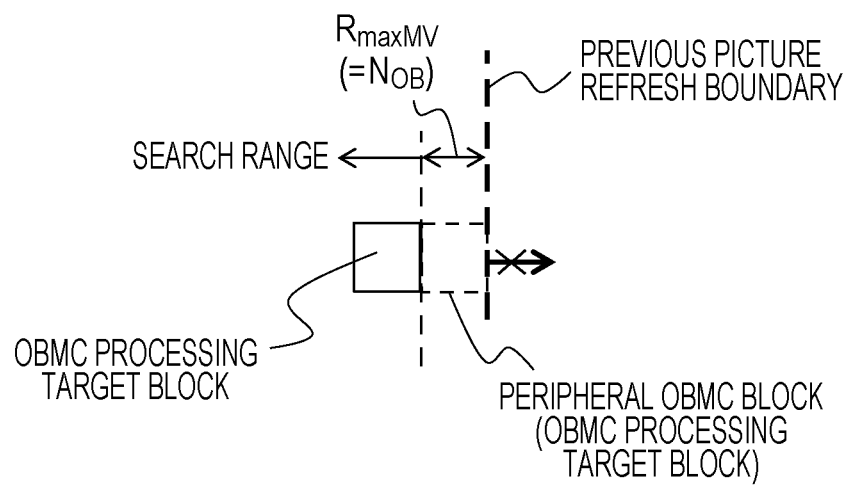
FIG. 10B is a diagram illustrating an example of a motion vector.

As illustrated in FIG. 10B, since the peripheral OBMC block out of the search range is not used for the processing a current block at the right end of the search range, even if the motion vector of the peripheral OBMC block exceeds the refresh boundary of the previous picture, the motion vector is not used. Therefore, the motion vector detection unit 122 does not detect a motion vector that exceeds the refresh boundary of the previous picture for the processing a current block. In this case, if there is a peripheral OBMC block within the search range, the motion vector detection unit 122 detects the motion vector of the processing a current OBMC block by using the peripheral OBMC block.

As illustrated in FIG. 10B, there is a case where the processing a current block (OBMC block) exists immediately to the left of the refresh boundary of the previous picture beyond the search range (dotted line block). In this case, the search range restriction unit 121 restricts the search range of the reference block to a range that does not exceed the refresh boundary of the previous picture.

In the above, the example of the search range of the reference block in the horizontal direction at the time of vertical intra refresh has been described.

The above example has described the example of OBMC discussed in JVET.

Figure 11A:
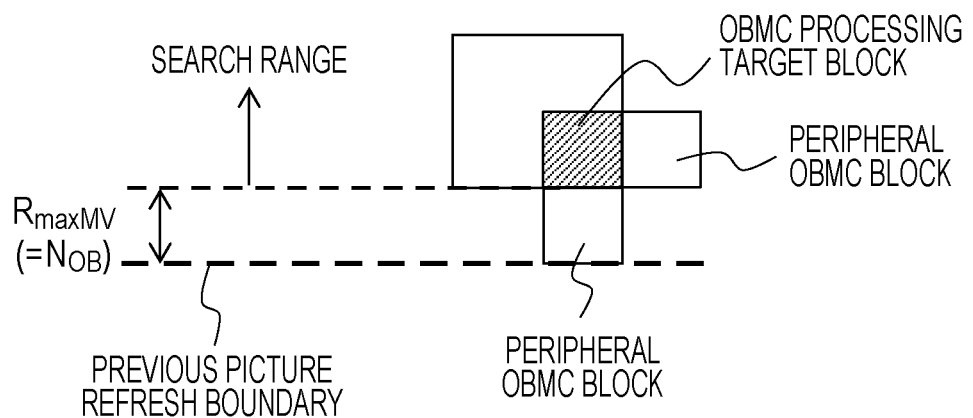
FIGS. 11A and 11B are diagrams illustrating examples of search ranges.
Figure 11B:
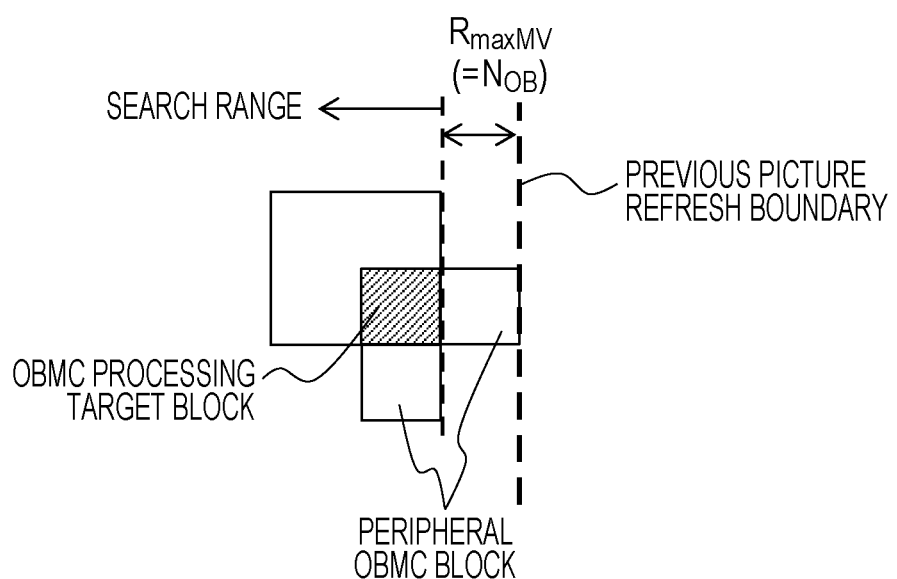

FIGS. 11A and 11B are diagrams illustrating examples of OBMC applied in H.263. In H.263, for example, as illustrated in FIGS. 11A and 11B, regarding the relationship between the processing a current block of OBMC to be applied and the peripheral block, there may be peripheral blocks adjacent to the processing a current block (diagonal lines) on the right side and the lower side.

Even in the case where OBMC of H.263 is applied, in the case of horizontal intra refresh, the search range is the range represented by Equation (1). For example, as illustrated in FIG. 11A, when a processing a current block (OBMC block) exists at the lower end of the search range, the peripheral OBMC block on the lower side is out of the search range. The motion vector detection unit 122 calculates the motion vector of the processing a current OBMC block by using the motion vector of the peripheral OBMC block on the right side within the search range without using the motion vector of the peripheral OBMC.

Also in the case of vertical intra refresh, the search range is the range indicated by Equation (1). For example, as illustrated in FIG. 11B, even when a processing a current block (OBMC block) exists at the right end of the search range, the peripheral OBMC block on the right side is out of the search range. The motion vector detection unit 122 calculates the motion vector of the processing a current OBMC block by using the motion vector of the peripheral OBMC block on the lower side within the search range without using the motion vector of the peripheral OBMC.

Even in the case of OBMC according to H.263, there are cases where the processing a current block exists just above the refresh boundary (in the case of horizontal intra refresh) and on the left side (in the case of vertical intra refresh) beyond the search range. Also in this case, the search range restriction unit 121 may restrict the search range to a range that does not exceed the refresh boundary of the previous picture, as in FIGS. 7B and 10B.

In the above, the vertical restriction range and the horizontal restriction range have been described.

Returning to FIG. 2, the video encoding apparatus 100 restricts the search range in the vertical direction by horizontal intra refresh (S15), restricts the search range in the horizontal direction by vertical intra refresh (S18), and then performs PU processing. (S16).

The PU processing includes, for example, processing for detecting a motion vector within the restricted search range and processing for generating prediction data of a predicted image by inter prediction. For example, there is a series of following processing. That is, the motion vector detection unit 122 searches for a reference block for the processing a current block within the search range and detects a motion vector. The inter prediction unit 123 generates prediction data of the predicted image by using the motion vector and the decoded image of the previous picture. The intra and inter determination unit 125 selects prediction data based on inter prediction, and the predicted image generation unit 126 outputs the selected prediction data as image data of the predicted image.

When the video encoding apparatus 100 ends the PU processing, the series of processing ends (S17).

Figure 3:
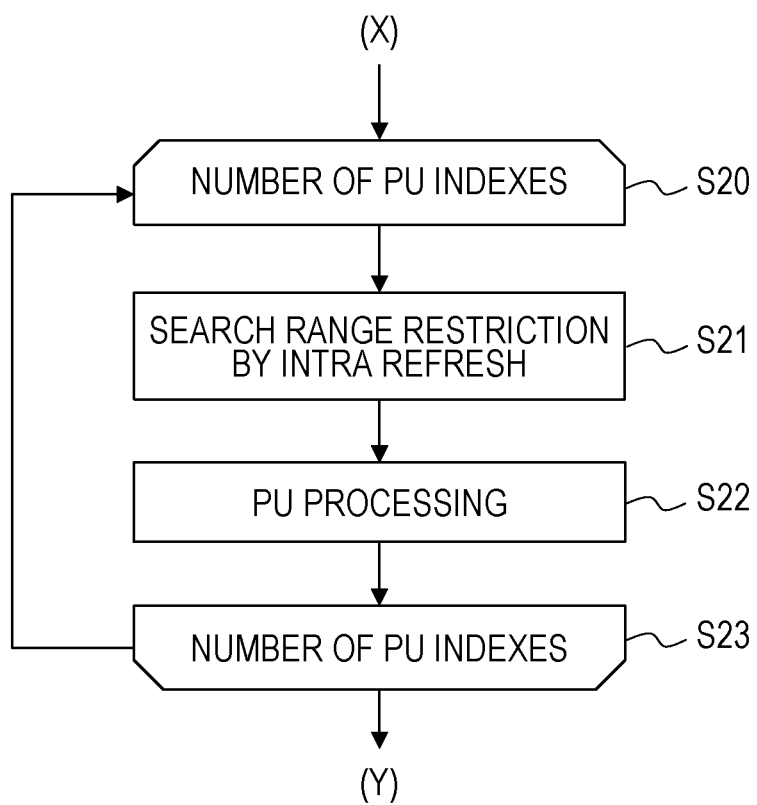
FIG. 3 is a flowchart illustrating an operation example.

On the other hand, when not in the OBMC mode (No in S11), for example, the video encoding apparatus 100 repeats the processing from S21 to S22 illustrated in FIG. 3 for the number of PUs included in the CU (loop from S20 to S23). That is, the video encoding apparatus 100 assigns an index to each PU included in the CU and performs processing for restricting the search range by intra refresh for each PU in order from the smallest index (S21).

For example, when the processing a current block is within the refreshed area of the current picture, the search range restriction unit 121 restricts the search range of the reference block to a range up to the refresh boundary of the previous picture. However, the search range restriction unit 121 may not restrict the search range particularly when the processing a current block is within the range of the unrefreshed area of the current picture.

Next, the video encoding apparatus 100 performs PU processing (S22). For example, the motion vector detection unit 122 searches for a reference block within the restricted search range or unrestricted search range to detect a motion vector. Thereafter, the processing in the inter prediction unit 123 is the same as S16 in FIG. 2.

Returning to FIG. 3, thereafter, the video encoding apparatus 100 performs the processing of S21 and S22 on all the PUs included in the CU. When the PU processing has been completed for all the PUs, the video encoding apparatus 100 ends the series of processing (S17 in FIG. 2).

On the other hand, when the current CU is not in the refreshed area of the current picture (No in S12), the video encoding apparatus 100 performs the processing from S20 to S23 in FIG. 3. In this case, for example, when the current CU exists in the picture P2 illustrated in FIG. 4B, this is a case where the current CU exists below the refresh boundary of the current picture $P_2$. In this case, the motion vector detection unit 122 detects a motion vector with reference to the unrefreshed area of the previous picture by inter prediction.

Returning to FIG. 2, when the PU size is smaller than the OBMC block size $N_{OB}$ (No in S13), the processing from S20 to S23 in FIG. 3 is performed. In this case, since one OBMC block size is larger than the PU size, the processing from S20 to S23 illustrated in FIG. 3 is performed as exceptional handling.

As described above, in the first embodiment, when applying OBMC by using the intra refresh method, the search range of the reference block for the processing a current block is restricted to max (0, $R_{maxMV} - N_{OB}$). Thereby, for example, the motion vector detection unit 122 does not detect a motion vector exceeding the refresh boundary of the previous picture. For this reason, the decoding side does not generate a decoded image by using a block in the unrefreshed area of the previous picture. Therefore, the decoded image does not deteriorate. Therefore, in the video encoding apparatus 100, even when OBMC is applied when encoding by using the intra refresh method, it is possible to operate the OBMC normally.

Second Embodiment

In the first embodiment, the example has been described in which the video encoding apparatus 100 restricts the search range of the reference block to max (0, $R_{maxMV}-N_{OB}$) when applying OBMC. A second embodiment is an example in which the video encoding apparatus 100 turns off the OBMC when the search result of a motion vector exceeds a predetermined range.

Figure 12:
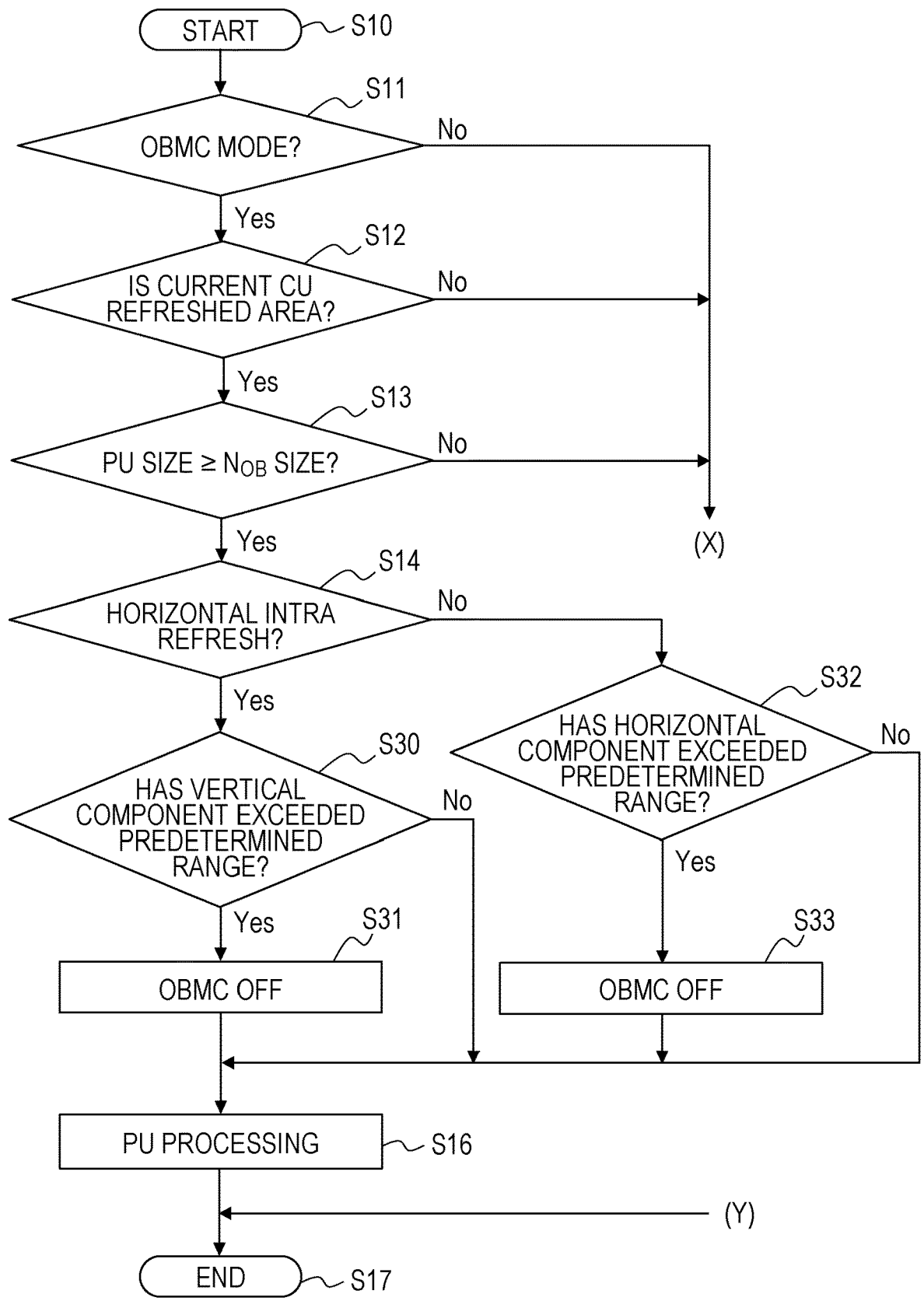
FIG. 12 is a flowchart illustrating an operation example.

FIG. 12 is a flowchart illustrating an operation example in the second embodiment.

S10 to S14 are the same as those in the first embodiment.

During horizontal intra refresh (Yes in S14), the video encoding apparatus 100 determines whether or not the vertical component of the motion vector of a reference block for a processing a current block exceeds a predetermined range ($R_{maxMV}-N_{OB}$) (S30). For example, the video encoding apparatus 100 performs the following processing.

That is, the search range restriction unit 121 does not particularly perform processing for restricting the search range. For this reason, the motion vector detection unit 122 does not restrict the search range of the reference block. The motion vector detection unit 122 determines whether or not the vertical position of the reference block in the motion vector search exceeds the predetermined range ($R_{maxMV}-N_{OB}$). That is, the motion vector detection unit 122 determines whether or not the vertical component of the motion vector of the processing block has exceeded the predetermined range ($R_{maxMV}-N_{OB}$).

When the search result of the motion vector (or reference block) exceeds the predetermined range (Yes in S30), the video encoding apparatus 100 turns off OBMC (S31). For example, when the motion vector of the processing block exceeds the predetermined range ($R_{maxMV}-N_{OB}$), the motion vector detection unit 122 does not perform processing for detecting a motion vector by using OBMC. In this case, the motion vector detection unit 122 performs PU processing by using the motion vector as it is (S16).

In OBMC, not only a motion vector of the processing a current block but also a peripheral motion vector is used. Therefore, for example, if the motion vector of the processing a current block exceeds a predetermined range, the motion vectors of the peripheral blocks may exceed the predetermined range. In such a case, when the OBMC processing is performed, a motion vector to be processed may be calculated by using the motion vectors of the peripheral blocks that exceed the refresh boundary of the previous picture. Therefore, in this second embodiment, in such a case, OBMC is turned off to minimize the possibility.

On the other hand, when the search result of a motion vector does not exceed the predetermined range (No in S30), the video encoding apparatus 100 continues the OBMC mode and performs PU processing (S16). In the PU processing, for example, the motion vector detection unit 122 calculates the motion vector of the processing a current block by using the motion vectors of the peripheral blocks using OBMC.

On the other hand, during vertical intra refresh, not vertical intra refresh (No in S14), the video encoding apparatus 100 determines whether or not the horizontal component of the motion vector exceeds a predetermined range (S32), and when the horizontal component exceeds (Yes in S32), the OBMC is turned off (S33).

On the other hand, when the horizontal search result of the motion vector does not exceed the predetermined range (No in S32), the video encoding apparatus 100 continues the OBMC mode and performs PU processing (S16).

Also in the second embodiment, when the motion vector of the processing a current block exceeds the search range, the video encoding apparatus 100 may reduce the possibility of referring to the block in the unrefreshed area of the previous picture, for example, by turning off the OBMC. Therefore, it is possible to reduce the possibility of referring to an error included in the unrefreshed area on the decoding side. Therefore, in the video encoding apparatus 100, even when OBMC is applied when encoding by the intra refresh method, it is possible to operate the OBMC normally. Even on the decoding side, it is possible to suppress the decoded image from being deteriorated by referring to the unrefreshed area.

In the second embodiment described above, the example in which the predetermined range is ($R_{maxMV}-N_{OB}$) has been described. For example, the predetermined range may be used as the refresh boundary of the previous picture.

Other Embodiments

Figure 13:
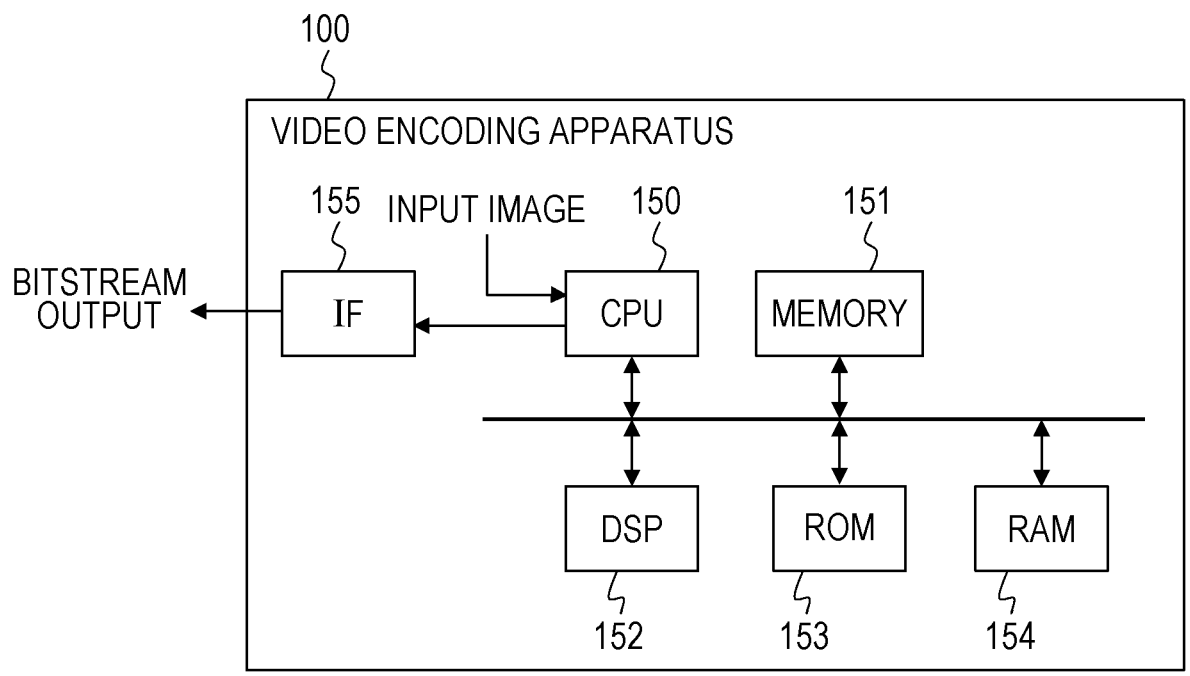
FIG. 13 is a diagram illustrating a hardware configuration example of a video encoding apparatus.
Figure 15:
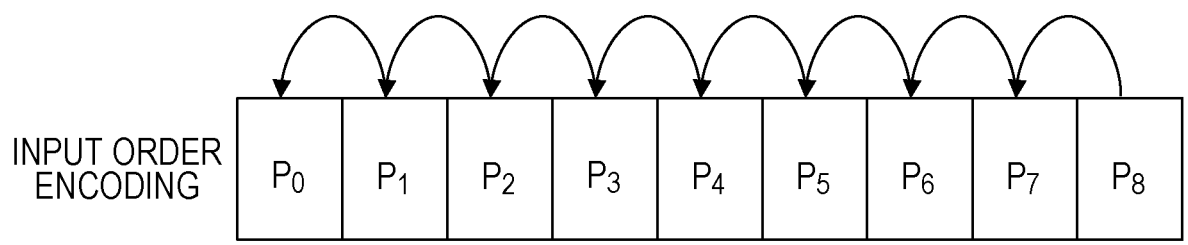
FIG. 15 is a diagram illustrating an input order of pictures in the intra refresh method.

FIG. 13 is a diagram illustrating a hardware configuration example of the video encoding apparatus 100.

The video encoding apparatus 100 includes a central processing unit (CPU) 150, a memory 151, a digital signal processor (DSP) 152, a read-only memory (ROM) 153, a random-access memory (RAM) 154, and an interface (IF) 155.

The CPU 150 reads a program stored in the ROM 153, loads the program into the RAM 154, and executes the loaded program. With this execution, the CPU 150 implements the functions of the control unit 110, the intra refresh determination unit 120, and the search range restriction unit 121, for example. The CPU 150 corresponds to, for example, the control unit 110, the intra refresh determination unit 120, and the search range restriction unit 121 in the first embodiment.

The DSP 152 implements the functions of the motion vector detection unit 122 and the encoding unit 130, for example, according to instructions from the CPU 150. The DSP 152 implements the functions by a computer-readable program. The DSP 152 corresponds to, for example, the motion vector detection unit 122 and the encoding unit 130 in the first embodiment. The CPU 150 and the DSP 152 are called a processor respectively. The DSP 152 may include a memory as a computer-readable recording medium for storing one or more programs. The DSP 152 may read into the memory the one or more programs stored in the ROM 153 or another ROM as a computer-readable recording medium.

The memory 151 corresponds to the frame memory 116 of the first embodiment, for example.

For example, the IF 155 collectively outputs the encoded data output from the variable length encoding unit 113 as a bit stream to the decoding side.

A processor sets a search range from a first processing block to a side closer to the first processing block by a size of a second processing block from a boundary between a refreshed area and an unrefreshed area in a second picture preceding a first picture in which the first processing block exists in the encoding order, detects a first motion vector for the first processing block in the search range, performs a weighted average of a second motion vector detected in the second processing block around the first processing block and the first motion vector to obtain the first motion vector, generates first prediction data by using the first motion vector and the second picture, uses another block in an intra slice line of the first picture to generate second prediction data in the block in the intra slice line, and encodes the first picture by using the first and second prediction data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium comprising a video encoding program which, when executed by a first processor coupled to a memory and a second processor coupled to the first processor, cause the first processor and the second processor to:

set, by the first processor, a search range of a reference block for a first processing block to a range from the first processing block to a side closer to the first processing block by a size of a second processing block from a refresh boundary between a refreshed area through which an intra slice line has passed in a second picture preceding a first picture in which the first processing block exists in an encoding order and an unrefreshed area through which the intra slice line has not passed, and when a distance from the first processing block to the refresh boundary is $R_{maxMV}$ and the size of the second processing block is $N_{OB}$, the first processor sets the search range of the reference block to a range satisfying Equation max (0, $R_{maxMV}-N_{OB}$), detect, by the second processor, a first motion vector for the first processing block in the search range, and perform a weighted average of a second motion vector detected in the second processing block around the first processing block and the first motion vector to obtain an averaged first motion vector, and generate, by the second processor, first prediction data by using the averaged first motion vector and the second picture, generate second prediction data in a block in the intra slice line by using another block in the intra slice line of the first picture, and encode the first picture by using the first and second prediction data.

2. The computer-readable recording medium of claim 1, wherein when the intra slice line is circulated in a vertical direction over an image, the first processor sets the search range of the reference block to a range from a lower end of the first processing block to the side closer to the first processing block by the size of the second processing block from the refresh boundary.

3. The computer-readable recording medium of claim 1, wherein when the intra slice line is circulated in a horizontal direction over an image, the first processor sets the search range of the reference block to a range from a right end of the first processing block to the side closer to the first processing block by the size of the second processing block from the refresh boundary.

4. The computer-readable recording medium of claim 1, wherein instead of setting the search range of the reference block to a range from the first processing block to the side closer to the first processing block by the size of the second processing block from the refresh boundary, when detecting the first motion vector for the first processing block, when the reference block exceeds the search range, the second processor generates the first prediction data by using the detected first motion vector without calculating a weighted average with the second motion vector, and when the reference block does not exceed the search range, the second processor generates the first prediction data by using the averaged first motion.

5. The computer-readable recording medium of claim 1, wherein the second processor sets a search range of a reference block for a third processing block to a range from the first processing block to a side closer to the first processing block by a size of the second processing block from the refresh boundary, and the third processing block includes the first processing block.

6. The computer-readable recording medium of claim 5, wherein in the second processor, the third processing block is a prediction unit (PU), and the first processing block is a sub-block of overlapped block motion compensation (OBMC).

7. The computer-readable recording medium of claim 1, wherein in the first processor, the second processing block is all or a part of upper, lower, left, and right blocks adjacent to the first processing block.

8. The computer-readable recording medium of claim 1, wherein in the second processor, an encoding method of encoding a part of a picture to be encoded by inter prediction encoding, by using intra prediction encoding and circulating the intra slice line with a plurality of pictures is an intra refresh encoding method, and in the second processor, a method of calculating the averaged first motion vector is overlapped block motion compensation (OBMC).

9. A video encoding apparatus comprising:

a memory;

a first processor coupled to the memory and the first processor configured to set a search range of a reference block for a first processing block to a range from the first processing block to a side closer to the first processing block by a size of a second processing block from a refresh boundary between a refreshed area through which an intra slice line has passed in a second picture preceding a first picture in which the first processing block exists in an encoding order and an unrefreshed area through which the intra slice line has not passed, and when a distance from the first processing block to the refresh boundary is $R_{maxMV}$ and the size of the second processing block is $N_{OB}$, the first processor is configured to set the search range of the reference block to a range satisfying Equation max (0, $R_{maxMV}-N_{OB}$); and a second processor coupled to the first processor and the second processor configured to:

detect a first motion vector for the first processing block in the search range, and perform a weighted average of a second motion vector detected in the second processing block around the first processing block and the first motion vector to obtain an averaged first motion vector, and generate first prediction data by using the averaged first motion vector and the second picture, generate second prediction data in a block in the intra slice line by using another block in the intra slice line of the first picture, and encode the first picture by using the first and second prediction data.

10. The video encoding apparatus of claim 9, wherein when the intra slice line is circulated in a vertical direction over an image, the first processor is configured to set the search range of the reference block to a range from a lower end of the first processing block to the side closer to the first processing block by the size of the second processing block from the refresh boundary.

11. The video encoding apparatus of claim 9, wherein when the intra slice line is circulated in a horizontal direction over an image, the first processor is configured to set the search range of the reference block to a range from a right end of the first processing block to the side closer to the first processing block by the size of the second processing block from the refresh boundary.

12. The video encoding apparatus of claim 9, wherein
instead of setting the search range of the reference block to a range from the first processing block to the side closer to the first processing block by the size of the second processing block from the refresh boundary,
when detecting the first motion vector for the first processing block, when the reference block exceeds the search range, the second processor is configured to generate the first prediction data by using the detected first motion vector without calculating a weighted average with the second motion vector, and
when the reference block does not exceed the search range, the second processor is configured to generate the first prediction data by using the averaged first motion vector.

13. The video encoding apparatus of claim 9, wherein
the second processor is configured to set a search range of a reference block for a third processing block to a range from the first processing block to a side closer to the first processing block by a size of the second processing block from the refresh boundary, and
the third processing block includes the first processing block.

14. The video encoding apparatus of claim 13, wherein in the second processor, the third processing block is a prediction unit (PU), and the first processing block is a sub-block of overlapped block motion compensation (OBMC).

15. The video encoding apparatus of claim 9, wherein in the second processor, the second processing block is all or a part of upper, lower, left, and right blocks adjacent to the first processing block.

16. The video encoding apparatus of claim 9, wherein
an encoding method of encoding a part of a picture to be encoded by inter prediction encoding, by using intra prediction encoding and circulating the intra slice line with a plurality of pictures is an intra refresh encoding method, and
a method of calculating the averaged first motion vector is overlapped block motion compensation (OBMC).

* * * * *